United States Patent [19]

Utman et al.

[11] 3,924,878
[45] Dec. 9, 1975

[54] PROTECTIVE HOUSING MEANS FOR TRAILER COUPLER HITCHED TO VEHICLE OR DEVICE

[76] Inventors: Leslie H. Utman, 1441 NW. 19th St. Apt. 231, Miami, Fla. 33142; Dante M. Fiorini, 23 Prospect Drive, Coral Gables, Fla. 33133

[22] Filed: June 15, 1972

[21] Appl. No.: 263,212

Related U.S. Application Data

[63] Continuation-in-part of Ser. No. 145,760, May 21, 1971, abandoned.

[52] U.S. Cl. ................................................ 280/507
[51] Int. Cl.² .......................................... B60D 1/12
[58] Field of Search ...... 280/507, 511, 512; 70/258, 70/231

[56] References Cited
UNITED STATES PATENTS

| | | | |
|---|---|---|---|
| 2,641,124 | 6/1953 | Gallagher et al. | 280/507 |
| 3,233,913 | 2/1966 | Brown | 280/507 |
| 3,391,555 | 7/1968 | Mamo | 280/507 |
| 3,514,980 | 6/1970 | Doyle | 280/507 |
| 3,605,457 | 9/1971 | Foster | 280/507 |

*Primary Examiner*—Leo Friaglia
*Assistant Examiner*—David M. Mitchell
*Attorney, Agent, or Firm*—Cushman, Darby and Cushman

[57] ABSTRACT

A protective housing structure is provided for shielding a standard trailer coupler, and an associated padlock, from tampering and from excessive exposure to weathering and highway abrasions. The protective housing is in the form of a hollow structure which can be received and held in place on a trailer coupler while the coupler is hitched to a prime mover or other device, and the housing is shaped to protect not only the coupler but its associated padlock assembly and interior parts. The protective housing may be secured in place by the same type of padlock assemblies which are conventionally used with couplers to prevent an unwanted actuation of a coupler from a hitched condition to an unhitched condition.

10 Claims, 7 Drawing Figures

INVENTORS
LESLIE H. UTMAN
DANTE M. FIORINI

BY Cushman, Darby & Cushman
ATTORNEYS

PROTECTIVE HOUSING MEANS FOR TRAILER COUPLER HITCHED TO VEHICLE OR DEVICE

This application is a continuation-in-part application of our copending application Ser. No. 145,760, filed May 21, 1971 bearing the same title as this application and now abandoned.

BACKGROUND AND BRIEF DESCRIPTION OF INVENTION

This invention relates to apparatus for protecting and shielding a coupler and padlock assembly of a trailer coupling while a trailer is coupled to a prime mover or other device or vehicle.

The growing use of trailers as a means of transporting boats, camping equipment, cargo and other items has led to a need for insuring that a trailer cannot be separated from its prime mover (or other device to which it is articulated) by unauthorized persons. Much of the prior art development on this subject has been directed to a separate need for protecting trailer couplers from unauthorized use when the trailers are left unhitched from other vehicles or devices, and apparently the thinking has been that once a trailer is articulated to a prime mover there is no great concern about unauthorized use or loss of the trailer since it is under closer supervision and often includes a standard padlock assembly connected through portions of the trailer coupler to prevent removal of the coupler from a hitch. However, this form of security for trailers, coupled to prime movers or other vehicles is proving to be inadequate, and there are repeated occurrences of standard padlock assemblies being easily removed from trailer couplers which are otherwise unprotected.

The objective of the present invention is to provide for additional security and protection of a standard trailer coupling and its associated padlock assembly by securing a protective housing structure over the entire coupler and padlock assembly when the coupler is hitched to a prime mover or other device. It is not unknown to provide some form of restraint to prevent unauthorized actuation of a coupler while in a hitched condition, as indicated by the device shown in U.S. Pat. No. 3,391,555. However, devices of this type require special locking constructions and other constructional features which are relatively costly and which prevent widespread acceptance and usage as compared to the much simpler structures proposed by the present invention.

In accordance with the present invention, a relatively simple and strong protective housing is provided for use on a variety of sizes and shapes of standard trailer couplings. Typically, such standard trailer couplings are of a ball and socket type wherein a socket assembly is actuated from hitched to unhitched conditions by a lever arm associated therewith. Also, it is becoming a standard practice to provide for a conventional padlock assembly of known construction for use with such standard couplers to prevent unauthorized actuation of the lever arm. The present invention permits such standard equipment to be used in its present form without basic design modification and without the use of additional locking devices. This is accomplished by providing a protective housing structure which can be fitted over a coupler and its associated padlock assembly in such a way that both the padlock assembly and the coupler are fully protected and so that the padlock assembly of the coupler can function to secure and fix the housing in place.

Basically, the present invention provides for a protective housing means characterized as having a base plate portion and a cover plate portion defining a hollow structure open at one or both of its ends for being engaged over and around a trailer coupler and a padlock assembly associated therewith. The associated padlock assembly may comprise a separate standard padlock or a padlock incorporated into the assembly of the protective housing means. The hollow structure may be formed as an integral rigid structure from steel or other known materials which offer desired protection. The protective housing means includes a cutout slot formed in the forward edge of its base plate portion and extending rearwardly along the base plate portion for a sufficient distance to allow the protective housing to be slideably engaged and fitted over a variety of sizes and forms of standard couplers with the base plate portion being received under an actuating lever assembly associated with such standard couplers. The protective housing means further includes a bearing block or post rigidly affixed in its hollow interior to engage and fix the position of a sliding locking bar (which may be part of a standard bicycle lock) of the padlock assembly. The bearing block or post further functions to guide a U-shaped shackle portion of the padlock assembly into locking engagement with its locking bar portion. The arrangement is such that the movable portion of the padlock assembly fixes and secures the protective housing in place while it is carrying out its usual function of securing the lever arm of the coupler, and thus, no additional locking devices and keys are required for a use of the protective housing means.

The protective housing may be manufactured in a variety of shapes and forms to accommodate known couplers in use, and its dimensions may be adjusted to provide for additional shielding functions. For example, a relatively long structure can prevent tampering of a coupler and its associated padlock assembly while also acting as a shield against entry of salt, water, sand and other corrosive elements into the working elements of the coupler assembly.

These and other features and advantages of the present invention will become apparent in the more detailed discussion which follows. In that discussion, reference will be made to the accompanying drawings as briefly described below.

DETAILED DESCRIPTION OF INVENTION

Figure 1:
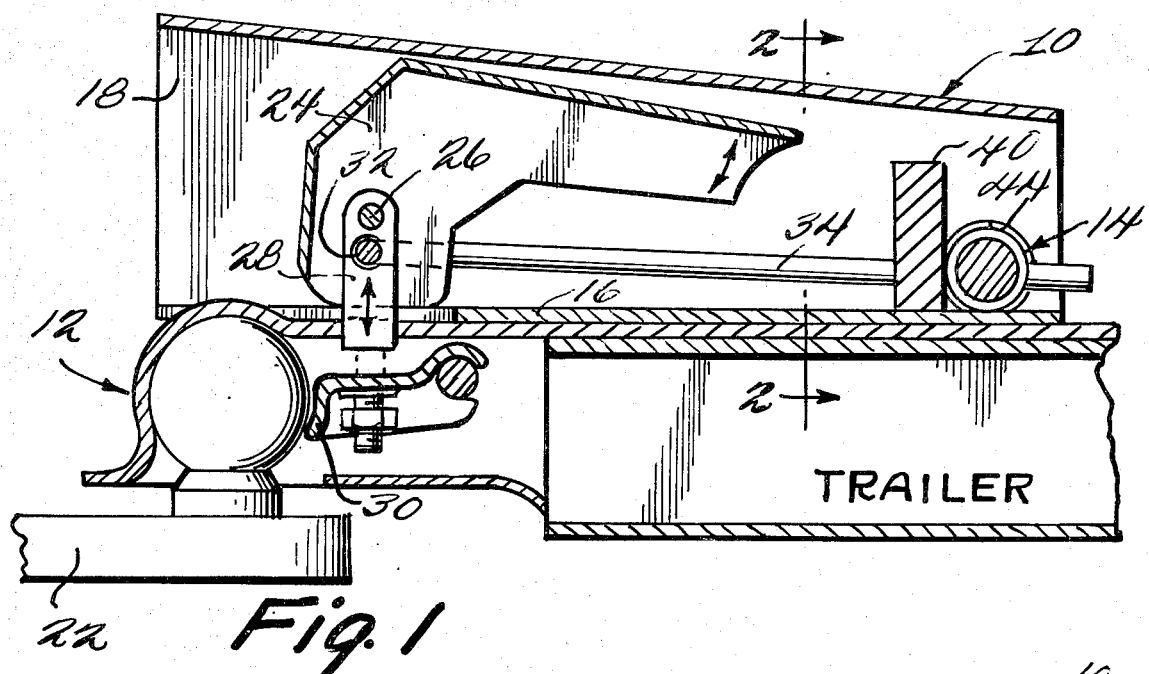
FIG. 1 is an elevational view, in section, of a standard coupler and its associated padlock assembly, showing one embodiment of a protective housing means of the present invention locked in place.
Figure 5:
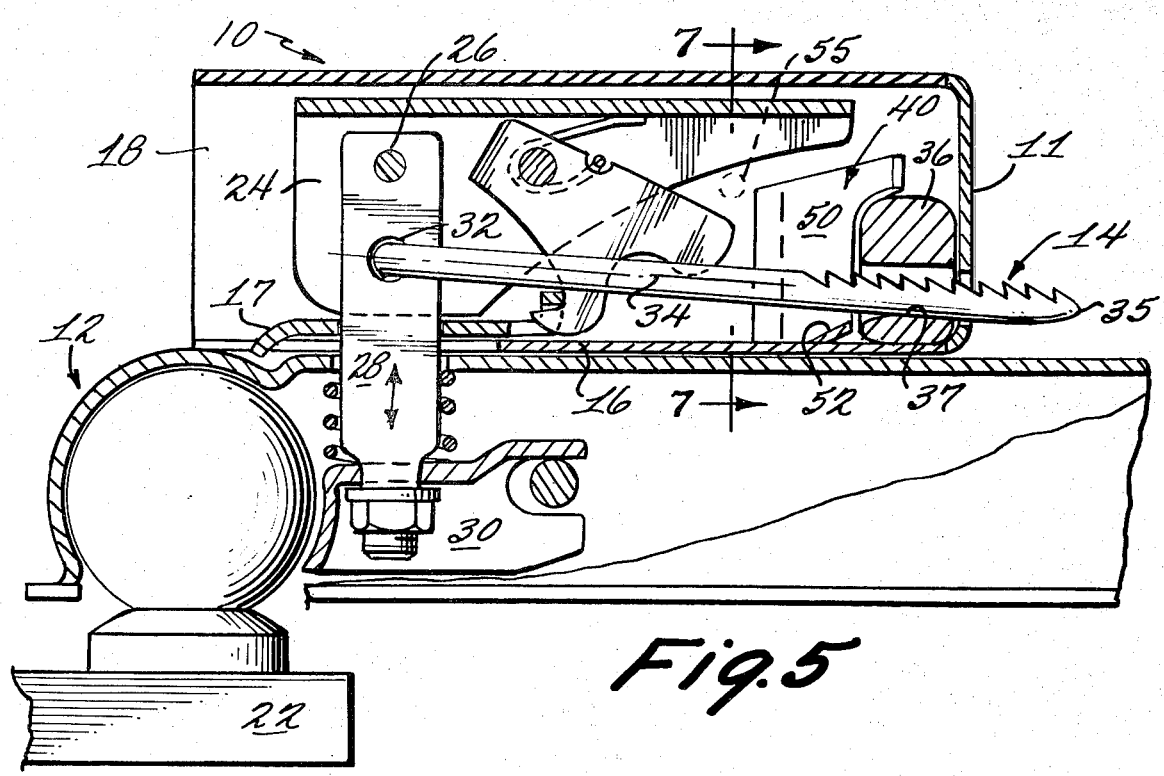
FIG. 5 is an elevational view, in section, of a second embodiment of a protective housing means in accordance with this invention, as secured to a standard coupler with a padlock type of assembly.

Referring to the embodiments of both FIGS. 1 and 5, a protective housing means 10, in accordance with the present invention, is illustrated in its operative position over and around a standard ball and hitch type trailer coupler 12 and its associated padlock assembly 14. As shown, the protective housing means 10 substantially covers and encloses the coupler and the padlock assembly. In this way, the actuating elements of the coupler and the padlock assembly itself are both protected from tampering which could damage or remove parts sufficiently to allow a trailer to be removed from a prime mover or other device.

Figure 4:
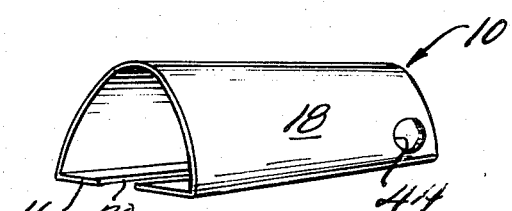
FIG. 4 is a perspective view, in reduced scale, showing a protective housing structure of a slightly different design from that shown in the other drawings.
Figure 2:
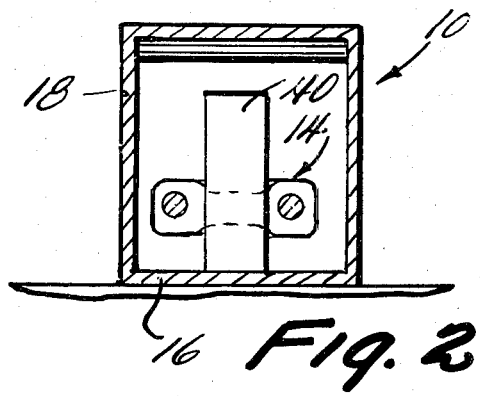
FIG. 2 is an end elevational view of a portion of the structure shown in FIG. 1, as seen on line 2—2 of FIG. 1.
Figure 3:
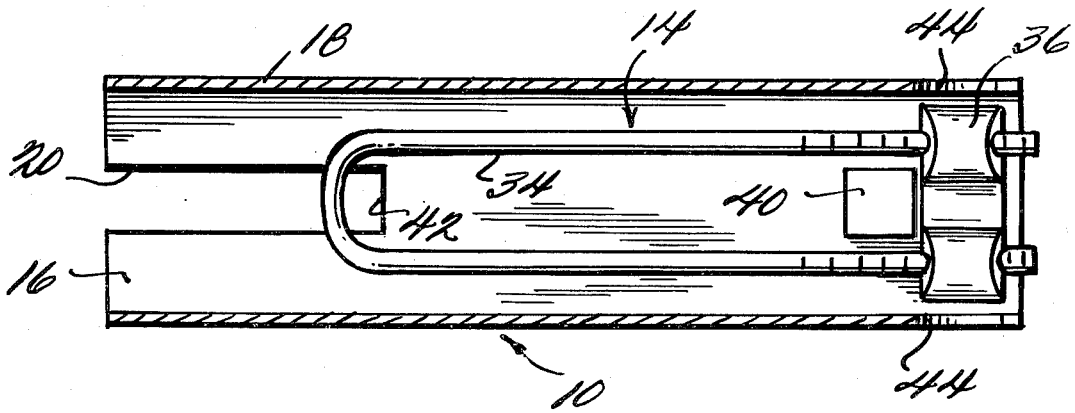
FIG. 3 is a top view, in section, of portions of the assembly shown in FIG. 1 to show the relative position of a padlock assembly within the hollow interior of the protective housing of this invention.

The protective housing means 10, as seen also in a different form in a perspective view in FIG. 4, comprises a generally elongate structure which may be open at each of its ends, as in FIG. 1, or only at its forward end, as in FIG. 5. Basically, the housing is defined by a base plate portion 16 and a cover plate portion 18. In the embodiments of FIGS. 1 through 3, the cover plate portion 18 actually is made up three separate elongate plate elements which are welded together to form a cover plate portion for the protective housing. However, the cover plate portion 18 can be formed as an integral structure, as in FIG. 5, and can be of any suitable shape or configuration to accommodate known trailer couplers. In the FIG. 1 embodiment the cover plate portion 18 is welded to, or otherwise affixed to, the base plate portion 16 so that an essentially integral structure is formed. Preferably, the protective housing is formed from steel or other metal which will provide a rigid and secure structure that is not easily damaged or broken.

The protective housing 10 is provided with a cutout slot 20 which extends from a forward edge of the base plate portion 16 to a rearward point along the mid-axis of the base plate. The length of the slot 20 is sufficient to allow the protective housing 10 to be slideably engaged relative to a variety of sizes and designs of known trailer couplers. The function of the slot 20 is to allow placement of the base plate portion 16 of the protective housing beneath a standard actuating lever of a trailer coupling while, at the same time, allowing the cover portion 18 to surround and shield the actuating lever of the coupler.

One example of such a relationship is shown in FIG. 1 wherein the trailer coupler 12 is illustrated in a hitched condition relative to a hitching post 22 carried by a prime mover or other vehicle or device. The illustrated coupler 12 is of a ball and socket type wherein the socket portion of the coupler can be actuated from hitched to unhitched conditions by a lever arm 24 associated therewith. The lever arm 24 pivots about a pivotal axis 26 so as to raise or lower an actuating rod 28 associated with a movable portion 30 of the socket assembly. These structures are conventional and do not form a separate part of the present invention and can be further understood, for example, by reference to the aforesaid U.S. Pat. No. 3,391,555. The protective housing 10 is designed to be received with its base plate 16 positioned and secured below the lever arm 24 of the coupler of FIG. 1. This is accomplished by provision of the aforesaid slot 20 which allows the protective housing to be slideably placed in its operative position by sliding the forward edge of the base plate portion of the housing beneath the lever arm 24 and around the actuating rod 28 of the coupler, thereby establishing a snug fit with the movable portions of the coupler assembly and its actuating rod 28. Once in place, the protective housing cannot be lifted at its forward end because portions of the base plate 16 which surround the slot 20 contact laterally extending portions of the lever arm 24 structures in a metal-to-metal relationship. The width, shape and dimensions of the slot 20 are sufficient to accommodate a variety of sizes of actuating rods 28, or equivalent devices of couplers, while being so shaped to prevent upward movement of the housing relative to certain wider portions of the lever arm 24.

FIG. 1 also shows provision for locking a standard lever arm 24 of a coupler by a standard padlock assembly 14. This is accomplished by provision of a bore or aperture 32 formed transversely through the actuating rod 28 so as to be aligned with similar apertures formed in side wall portions of the lever arm 24 when the lever arm is in a position for maintaining a hitching relationship of its socket relative to a ball or post. Again, this is known in the art and does not form a separate part of the present invention.

Although a variety of padlock designs may be used with standard couplers of the type just discussed, it is preferred, for purposes of the present invention, that a conventional bicycle padlock assembly be used with the protective housing structure of the FIG. 1 embodiment. Such a padlock assembly includes a U-shaped shackle or bar 34 which is designed to receive a locking bar means 36 in sliding engagement with the terminal ends of the U-shaped shackle. The locking bar means 36 can be adjusted along the length of the U-shaped shackle to a desired position and then locked in place by a conventional locking mechanism (not shown) actuated by a key inserted into a key chamber carried in the body of the locking bar 36. In accordance with the present invention, this same padlock assembly 14 is utilized to secure the protective housing means 10 in place as well as to lock the position of the lever arm 24. This is done by providing a bearing block means or post 40 in a fixed position in the interior of the protective housing 10 to engage and limit movement of the locking bar 36 of the padlock assembly 14. As shown in FIGS. 1 through 3, the bearing block 40 may be affixed to the base plate portion 16, by welding or other known securement, but it is to be understood that the bearing block 40 could be affixed from the cover plate portion or extended all the way between the cover plate and the base plate portion, if desired. The bearing block 40 may be made from metal stock material of any cross sectional configuration or may comprise a bolt welded into the interior space of the protective housing 10 at the desired location.

It can be appreciated from the FIG. 1 view that once the protective housing 10 is in place and the padlock assembly 14 is locked against the bearing block 40, there can be no unauthorized removal of the protective housing 10. If desired the nut fastener at the lower end of the actuating rod 28 can be spot welded or burnished in place to prevent disassembly, and similar welds can be applied to removable portions of the hitch 22, as secured to a prime mover. Rearward movement of the housing is prevented by engagement of the bearing block 40 with the locking bar 36 of the padlock assembly, and forward movement is prevented by the ultimate engagement of an end 42 of the slot 20 with a portion of the actuating rod 28 of the coupler. Upward movement is prevented by the previously described engagement of the base plate portion 16 beneath the lever arm assembly of the coupler. Thus, the protective housing can be secured in a position to fully cover and protect both the coupler and its associated padlock assembly 14. Furthermore, the same padlock assembly 14 which is used to fix the hitched condition of the coupler is utilized to lock and secure the protective housing 10 in place. This does not prevent easy unlocking and removal of the protective housing when desired. For this purpose, access apertures 44 may be formed in the protective housing 10 to permit access of a key into a side mounted key chamber of the padlock assembly. Other key chambers are accessible from the trailing end of such padlock assemblies and can be easily reached through an opening in the end of the protective housing 10 without the use of side access apertures 44.

Figure 6:
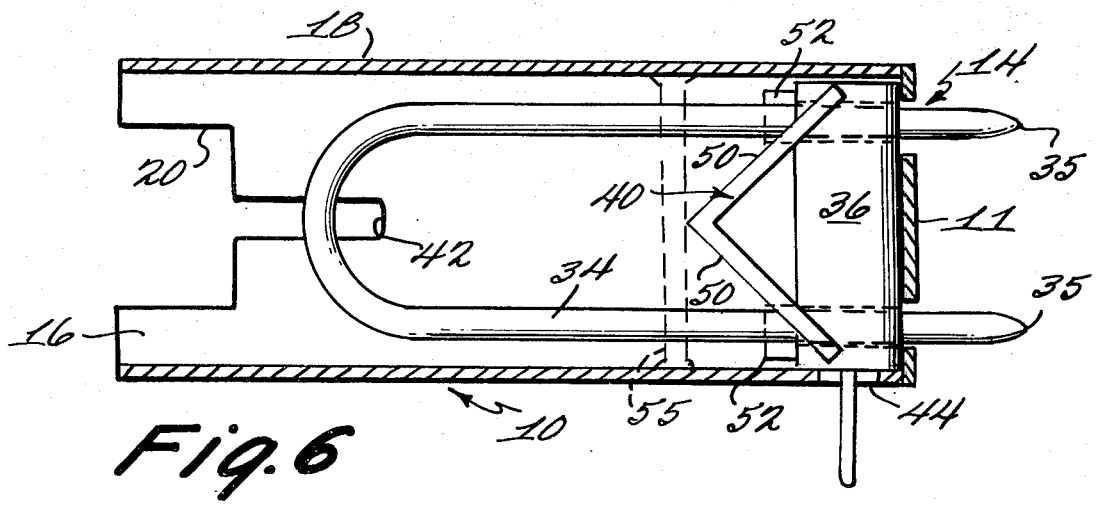
FIG. 6 is a top view, in section, of portions of the assembly shown in FIG. 5 to show the relative position of a padlock assembly within the hollow interior of a protective housing of this invention.
Figure 7:
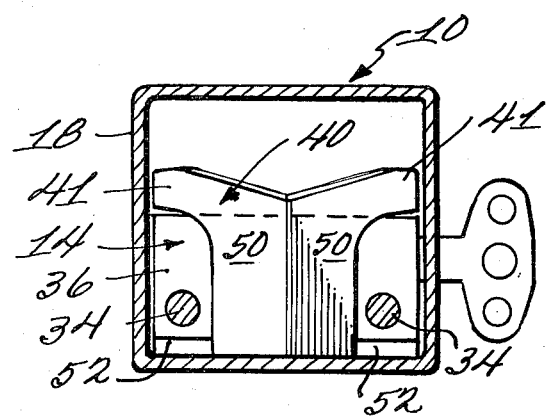
FIG. 7 is an end elevational view of a portion of the structure shown in FIG. 5, as seen on line 7—7 of FIG. 5.

The embodiment of FIGS. 5 – 7 is very similar to the embodiment of FIGS. 1 – 4 in its structure, function and use. In some respects the FIG. 5 embodiment may represent a preferred embodiment because of its provision for a permanently mounted locking bar 36 which is completely shielded and protected between an end plate 11 of the housing 10 and a bearing block means 40 within the housing. In other respects, the simpler design of the FIG. 1 embodiment may be preferred for certain uses.

The embodiment of FIG. 5 includes a cutout slot 20 (see FIG. 6) which is of a different configuration from what is shown in FIG. 3. Either embodiment may be provided with either configuration of a cutout slot 20, although the configuration shown in FIG. 6 lends itself to a wider application to various designs of couplers 12. For example, the coupler shown in FIG. 5 is of a known type which includes a plate element 17 as a part of its lever arm assembly, and a forward edge of the plate element 17 can drop down through a wider forward end of the cutout slot 20 to provide a tighter and more secure mounting of the protective housing relative to the coupler. The narrower end of the cutout provides for a snug fit of the housing around the rod 28.

The FIG. 5 embodiment of the invention also provides for a shaped bearing block means 40 which is welded or secured in place within the housing 10 to (a) fix the position of a locking bar 36 of a padlock assembly and to (b) guide terminal ends 35 of a U-shaped shackle through the housing and through apertures 37 formed in the locking bar 36. As illustrated, the bearing block means is shaped to present guiding surfaces 50 (see FIG. 6) and 52 (see FIG. 5) to guide a correct placement of the terminal ends 35 through the apertures of the locking bar 36 during sliding positioning of the protective housing over a coupling assembly. The guiding surfaces 52 may comprise ramps formed from the same sheet material from which the bearing block means 40 is formed, or they may be formed by adding material to the lower end of the bearing block as it is welded in place within the housing. In an alternative arrangement, the ramps 52 may be omitted, and the locking bar 36 may be modified to include inclined surfaces leading into its apertures 37. These surfaces cooperate with tapered configurations of the terminal ends 35 of the U-shaped shackle to lift the ends of the shackle into place.

As shown, the bearing block means 40 of the FIG. 5 embodiment is further provided with upper wing portions 41 (see FIG. 7) which extend over the position of the locking bar 36 to limit an upward movement of the locking bar. The locking bar 36 is placed in position behind the bearing block means 40, in the FIG. 5 embodiment, prior to securement of the end wall 11 to the housing. The end wall 11 is welded, during assembly, around its perimeter to the open end of the housing to form a closed end structure with its locking bar permanently held in place. The locking bar may be further secured in place by welding, if desired.

Having discussed the structural and functional features of two embodiments of the present invention, it can be appreciated that the invention offers certain advantages of simplicity in design, low cost of manufacture, and complete reliability in use for its protective function. Present day padlock assemblies are easily damaged and removed with relatively crude tools, but the protective housing structure of this invention prevents access of such tools to the portions of the coupler and its padlock assembly which are most easily damaged or removed.

Although the invention has been described with reference to a specific embodiment, it is contemplated that fully equivalent changes and modifications can be made in the basic structural features and relationships, if desired. The illustrated protective housing is provided with a larger opening at its forward end than at its trailing end so as to conform generally to present day conventional couplers. This can be modified to provide for better streamlining or additional shielding from weather, provided a sufficient opening is retained to allow a sliding engagement of a protective housing beneath and around a coupler device. In use, the coupler is secured in its hitched position by movement of the lever arm 24 clockwise to its limit position shown in FIGS. 1 and 5. Then, the U-shaped shackle of the padlock assembly is inserted through the aperture 32, and additional apertures of the lever arm which are aligned therewith in the hitched position, and the free ends of the U-shaped shackle are allowed to extend rearwardly without receiving the sliding locking bar 36. After this, the protective housing unit is moved forwardly so as to receive the terminal ends of the U-shaped shackle and to embrace a lower portion of the lever arm 24 and its associated actuating rod 28. Once the protective housing is in a desired position, the sliding bar member 36 of the padlock assembly can be secured between the terminal ends of the U-shaped shackle and locked in a position to engage the bearing block 40. This securement and locking occur automatically during sliding of the housing into position, in the FIG. 5 embodiment. The bearing block 40 is placed inwardly from the rear end of the protective housing structure for a sufficient distance to allow a seating of the locking bar member 36 under the cover of the protective housing. Unlocking of the protective housing is accomplished with a key inserted into a tumbler means carried within the locking bar, and access to the tumbler means is through the side apertures 44 formed in the housing.

Of course, it is contemplated that the invention may be practiced with many design variations from what has been discussed above. For example, the protective housing 10 may be formed as a completely integral structure from tubular stock material, and its upper surface may be creased or shaped to accommodate a range of trailer coupling designs. The cutout portion 20 may be of any suitable shape and dimension to accommodate existing trailer coupling assemblies, and the bearing block 40 may be of any suitable shape and may be assembled from one or more separate pieces. In a further modification of the invention, a cross bar 55 (see phantom lines, FIGS. 5 and 6) may be welded or otherwise secured across an interior section of the housing 10 to fit under the handle 24 when the protective housing is placed in a protective position over a coupling assembly. This arrangement is especially useful with trailer coupling assemblies which have no bottom plate 17 (FIG. 5) to fix the position of the housing. Alternatively, the bearing plate 40, of the FIG. 5 embodiment, can be designed to engage a bottom surface of the handle 24 for certain designs of protective housings.

What is claimed is:

1. Apparatus for use with a coupler for releasably hitching a trailer to a prime mover, said coupler having a member for releasing the trailer from the prime mover, said apparatus comprising
   a. a protective housing means for preventing access to the releasing member and preventing movement thereof from a hitched condition when in access-preventing relationship therewith, said means including a housing member having a first open end thereof for allowing sliding movement of said housing member over said releasing member, and
   b. means for locking the coupler in its hitched condition by securing said housing means in access-preventing relationship with the releasing member, said means including a first member positively connected to the coupler and a second member for operative connection to said housing means said housing means also being in access-preventing relationship with said first member.

2. Apparatus as recited in claim 1 wherein said first member comprises a U-shaped shackle having a closed end and two legs extending therefrom defining an open end, and wherein an aperture is formed in said releasing member, and wherein said shackle is connected at said closed end thereof to said releasing member by extending through said aperture.

3. Apparatus as recited in claim 2 wherein said second member comprises a locking member for surrounding said legs of said shackle, and preventing relative movement between said legs and said second member.

4. A locking device for an assembled trailer hitch having a lever for releasing it from its assembled position, said device comprising
   a. a U-shaped shackle having a closed end and two legs extending therefrom defining an open end,
   b. means for allowing operative connection of said U-shaped shackle at the closed end thereof to said lever, said means including means defining an aperture in said lever,
   c. means for substantially completely covering said lever and said shackle to prevent access thereto and operation thereof, said means including a housing member having a first open end thereof for allowing sliding movement of said housing member over said lever and said shackle, and
   d. locking means for operatively engaging the legs of said U-shaped shackle and for operatively engaging said housing member so that selectively said housing member may not be moved with respect to said lever to allow access to and operation of said lever to release the assembled hitch.

5. A locking device as recited in claim 4 wherein said locking means is key operated.

6. A device as recited in claim 4 further comprising means formed on an interior portion of said housing member for guiding said legs of said U-shaped shackle into operative engagement with said locking means.

7. A device as recited in claim 6 wherein said housing member has a bottom wall, and wherein said bottom wall has a slot formed therein, said slot adapted to receive a portion of said lever to assist said locking means in preventing movement of said housing member with respect to said lever.

8. A device as recited in claim 4 wherein said housing member has a second open end thereof opposite said first open end, corresponding to the open end of said shackle when said shackle is in operative connection with said lever and said housing member is covering said lever, and wherein said device further comprises means upstanding from an interior portion of said housing member adjacent said first open end thereof for abutting engagement with said locking means.

9. A device as recited in claim 8 wherein said locking means comprises a locking member dimensioned so that it may pass through said first open end of said housing member to engage said legs of said U-shaped shackle and to abut said upstanding means.

10. A locking device as recited in claim 4 wherein said locking means is fixed to said housing means.

* * * * *